US012786226B2

(12) United States Patent
Philip et al.

(10) Patent No.: US 12,786,226 B2
(45) Date of Patent: Nov. 3, 2026

(54) SYSTEM AND METHOD FOR DETECTING AND PREVENTING MALFEASANT TARGETING OF INDIVIDUAL USERS IN A NETWORK

(71) Applicant: BANK OF AMERICA CORPORATION, Charlotte, NC (US)

(72) Inventors: Charles Philip, Andheri West Mumbai (IN); Vaibhav Bansal, Delhi (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 287 days.

(21) Appl. No.: 18/206,694

(22) Filed: Jun. 7, 2023

(65) Prior Publication Data

US 2024/0414188 A1 Dec. 12, 2024

(51) Int. Cl.
*H04L 9/40* (2022.01)

(52) U.S. Cl.
CPC ........ *H04L 63/1441* (2013.01); *H04L 63/083* (2013.01); *H04L 63/1416* (2013.01); *H04L 63/1425* (2013.01)

(58) Field of Classification Search
CPC ........................ H04L 63/1416; H04L 63/1425
See application file for complete search history.

(56) References Cited

U.S. PATENT DOCUMENTS 8,819,769 B1 * 8/2014 van Dijk ............... H04L 67/303 726/1
10,084,809 B1 * 9/2018 Rambo ............. G06F 16/24578
10,536,475 B1 * 1/2020 McCorkle, Jr. ..... H04L 63/1425
11,394,719 B2 * 7/2022 Vegulla ................. H04L 63/102
2015/0370723 A1 * 12/2015 Nambiar ............. H04L 63/1425 711/159
2017/0103674 A1 * 4/2017 Sadeh-Koniecpol ........................ G06F 21/566
2017/0324745 A1 * 11/2017 Harpur ................ H04L 63/1416
2018/0124076 A1 * 5/2018 Zibuschka .......... H04L 63/1491
2019/0199745 A1 * 6/2019 Jakobsson ............. H04L 51/212
2020/0204572 A1 * 6/2020 Jeyakumar ............ G06F 21/561
2021/0075827 A1 * 3/2021 Grealish ............. H04L 63/1483
2021/0336983 A1 * 10/2021 Lee ..................... H04L 63/0245
2021/0398225 A1 * 12/2021 Crabtree ................ G06Q 40/08
2022/0060474 A1 * 2/2022 Trentini .............. H04L 63/0236
(Continued)

*Primary Examiner* — Hieu T Hoang
(74) *Attorney, Agent, or Firm* — Moore & Van Allen PLLC; Nicholas C. Russell

(57) ABSTRACT

Systems, computer program products, and methods for detecting and preventing malfeasant targeting of individual users in a network are provided. The method includes identifying a malfeasant communication data packet directed to a target user in a network. The method also includes causing a transmission of a malfeasant report for the target user. The malfeasant report includes information relating to previous malfeasant communication data packet (s) directed to the target user and one or more user access attributes including an access level to the network for the target user. Based on the malfeasant report and the malfeasant communication data packet, the method further includes determining a malfeasant threat level. The malfeasant threat level indicates a threat of a malfeasant communication to the target user. The method further includes causing a transmission of a malfeasant threat level alert in an instance in which the malfeasant threat level meets or exceeds a predetermined threat threshold.

17 Claims, 5 Drawing Sheets

(56) References Cited

U.S. PATENT DOCUMENTS

| | | | | |
|---|---|---|---|---|
| 2022/0188411 | A1* | 6/2022 | Lee | H04L 63/1416 |
| 2022/0279015 | A1* | 9/2022 | Sambamoorthy | H04L 51/212 |
| 2022/0377101 | A1* | 11/2022 | Kras | H04L 63/1483 |
| 2022/0394047 | A1* | 12/2022 | Lee | H04L 63/145 |
| 2023/0247051 | A1* | 8/2023 | Mutairi | H04L 63/1483<br>726/12 |
| 2024/0414188 | A1* | 12/2024 | Philip | H04L 63/083 |

* cited by examiner

SYSTEM AND METHOD FOR DETECTING AND PREVENTING MALFEASANT TARGETING OF INDIVIDUAL USERS IN A NETWORK

TECHNOLOGICAL FIELD

Example embodiments of the present disclosure relate generally to detecting and preventing network attacks and, more particularly, to detecting and preventing malfeasant targeting of individual users in a network.

BACKGROUND

Malfeasant attacks may be carried out on networks by sending data communications to users within a network. Malfeasant protection typically operates by blocking communications that may be malfeasant without storing the contents of the communication for further analysis. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for detecting and preventing malfeasant targeting of individual users in a network is provided. The system includes at least one non-transitory storage device containing instructions and at least one processing device coupled to the at least one non-transitory storage device. The at least one processing device, upon execution of the instructions, is configured to identify a malfeasant communication data packet in a network. The malfeasant communication data packet is directed to a target user of one or more users in the network. The at least one processing device, upon execution of the instructions, is also configured to cause a transmission of a malfeasant report for the target user based on the malfeasant communication data packet. The malfeasant report includes information relating to one or more previous malfeasant communication data packets directed to the target user and one or more user access attributes relating to the target user. The one or more user access attributes include an access level to the network for the target user. The at least one processing device, upon execution of the instructions, is further configured to determine a malfeasant threat level based on the malfeasant report and the malfeasant communication data packet. The malfeasant threat level indicates a threat of a malfeasant communication to the target user. The at least one processing device, upon execution of the instructions, is still further configured to cause a transmission of a malfeasant threat level alert in an instance in which the malfeasant threat level meets or exceeds a predetermined threat threshold. The malfeasant threat level meets or exceeds a predetermined threat threshold in an instance in which a predetermined number of the one or more previous malfeasant communication data packets has been reached or the access level of the target user is at or above a predetermined access threshold.

In various embodiments, the at least one processing device, upon execution of the instructions, is also configured to determine one or more malfeasant communication attributes relating to the malfeasant communication data packet with the one or more malfeasant communication attributes including the target user of the one or more users in the network and a malfeasance type. In various embodiments, the malfeasant threat level is higher in an instance in which at least one of the one or more previous malfeasant communication data packets are the same malfeasance type as the malfeasance communication data packet.

In various embodiments, the one or more user access attributes include at least one of a job title or job department of the target user and the malfeasant threat level is higher in an instance in which the target user is assigned to a job title that is designated as one of one or more vulnerable job titles or the target user is assigned to a job department that is designated as one of one or more vulnerable job departments.

In various embodiments, the at least one processing device, upon execution of the instructions, is also configured to determine at least one of the one or more vulnerable job titles or one or more vulnerable job departments with the at least one of the one or more vulnerable job titles or one or more vulnerable job departments being determined based on one or more previous malfeasant attacks on users assigned to the given job title or job department. In various embodiments, the at least one of the one or more vulnerable job titles or one or more vulnerable job departments are determined based on access levels of one or more users assigned to the given job title or job department.

In various embodiments, the at least one processing device, upon execution of the instructions, is also configured to designate the target user as a vulnerable user in an instance in which the target user has received a predetermined amount of the one or more previous malfeasant communication data packets and cause a transmission of one or more training actions to the target user in an instance in which the target user is designated as a vulnerable user with the one or more training actions including a fabricated malfeasant communication data packet, wherein the fabricated malfeasant communication data packet is designed to emulate a malfeasant communication data packet.

In another example embodiment, a computer program product for detecting and preventing malfeasant targeting of individual users in a network is provided. The computer program product includes at least one non-transitory computer-readable medium having computer-readable program code portions embodied therein. The computer-readable program code portions include one or more executable portions configured to identify a malfeasant communication data packet in a network. The malfeasant communication data packet is directed to a target user of one or more users in the network. The computer-readable program code portions including one or more executable portions are also configured to cause a transmission of a malfeasant report for the target user based on the malfeasant communication data packet. The malfeasant report includes information relating to one or more previous malfeasant communication data packets directed to the target user and one or more user access attributes relating to the target user. The one or more user access attributes include an access level to the network for the target user. The computer-readable program code portions including one or more executable portions are further configured to determine a malfeasant threat level based on the malfeasant report and the malfeasant communication data packet. The malfeasant threat level indicates a threat of a malfeasant communication to the target user. The computer-readable program code portions including one or more executable portions are still further configured to cause a transmission of a malfeasant threat level alert in an instance in which the malfeasant threat level meets or exceeds a predetermined threat threshold. The malfeasant threat level meets or exceeds a predetermined threat threshold in an instance in which a predetermined number of the one or more previous malfeasant communication data packets has been reached or the access level of the target user is at or above a predetermined access threshold.

In various embodiments, the computer-readable program code portions including one or more executable portions are also configured to determine one or more malfeasant communication attributes relating to the malfeasant communication data packet with the one or more malfeasant communication attributes including the target user of the one or more users in the network and a malfeasance type. In various embodiments, the malfeasant threat level is higher in an instance in which at least one of the one or more previous malfeasant communication data packets are the same malfeasance type as the malfeasance communication data packet.

In various embodiments, the one or more user access attributes include at least one of a job title or job department of the target user and the malfeasant threat level is higher in an instance in which the target user is assigned to a job title that is designated as one of one or more vulnerable job titles or the target user is assigned to a job department that is designated as one of one or more vulnerable job departments. In various embodiments, the computer-readable program code portions including one or more executable portions are also configured to determine at least one of the one or more vulnerable job titles or one or more vulnerable job departments with the at least one of the one or more vulnerable job titles or one or more vulnerable job departments being determined based on one or more previous malfeasant attacks on users assigned to the given job title or job department. In various embodiments, the at least one of the one or more vulnerable job titles or one or more vulnerable job departments are determined based on access levels of one or more users assigned to the given job title or job department.

In various embodiments, the computer-readable program code portions including one or more executable portions are also configured to designate the target user as a vulnerable user in an instance in which the target user has received a predetermined amount of the one or more previous malfeasant communication data packets and cause a transmission of one or more training actions to the target user in an instance in which the target user is designated as a vulnerable user with the one or more training actions including a fabricated malfeasant communication data packet, wherein the fabricated malfeasant communication data packet is designed to emulate a malfeasant communication data packet.

In still another example embodiment, a method for detecting and preventing malfeasant targeting of individual users in a network is provided. The method includes identifying a malfeasant communication data packet in a network. The malfeasant communication data packet is directed to a target user of one or more users in the network. The method also includes causing a transmission of a malfeasant report for the target user based on the malfeasant communication data packet. The malfeasant report includes information relating to one or more previous malfeasant communication data packets directed to the target user and one or more user access attributes relating to the target user. The one or more user access attributes include an access level to the network for the target user. The method further includes determining a malfeasant threat level based on the malfeasant report and the malfeasant communication data packet. The malfeasant threat level indicates a threat of a malfeasant communication to the target user. The method still further includes causing a transmission of a malfeasant threat level alert in an instance in which the malfeasant threat level meets or exceeds a predetermined threat threshold. The malfeasant threat level meets or exceeds a predetermined threat threshold in an instance in which a predetermined number of the one or more previous malfeasant communication data packets has been reached or the access level of the target user is at or above a predetermined access threshold.

In various embodiments, the method also includes determining one or more malfeasant communication attributes relating to the malfeasant communication data packet with the one or more malfeasant communication attributes including the target user of the one or more users in the network and a malfeasance type. In various embodiments, the malfeasant threat level is higher in an instance in which at least one of the one or more previous malfeasant communication data packets are the same malfeasance type as the malfeasance communication data packet.

In various embodiments, the one or more user access attributes include at least one of a job title or job department of the target user and the malfeasant threat level is higher in an instance in which the target user is assigned to a job title that is designated as one of one or more vulnerable job titles or the target user is assigned to a job department that is designated as one of one or more vulnerable job departments. In various embodiments, the method also includes determining at least one of the one or more vulnerable job titles or one or more vulnerable job departments with the at least one of the one or more vulnerable job titles or one or more vulnerable job departments being determined based on one or more previous malfeasant attacks on users assigned to the given job title or job department. In various embodiments, the at least one of the one or more vulnerable job titles or one or more vulnerable job departments are determined based on access levels of one or more users assigned to the given job title or job department.

In various embodiments, the method also includes designating the target user as a vulnerable user in an instance in which the target user has received a predetermined amount of the one or more previous malfeasant communication data packets and causing a transmission of one or more training actions to the target user in an instance in which the target user is designated as a vulnerable user. The one or more training actions include a fabricated malfeasant communication data packet with the fabricated malfeasant communication data packet being designed to emulate a malfeasant communication data packet.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
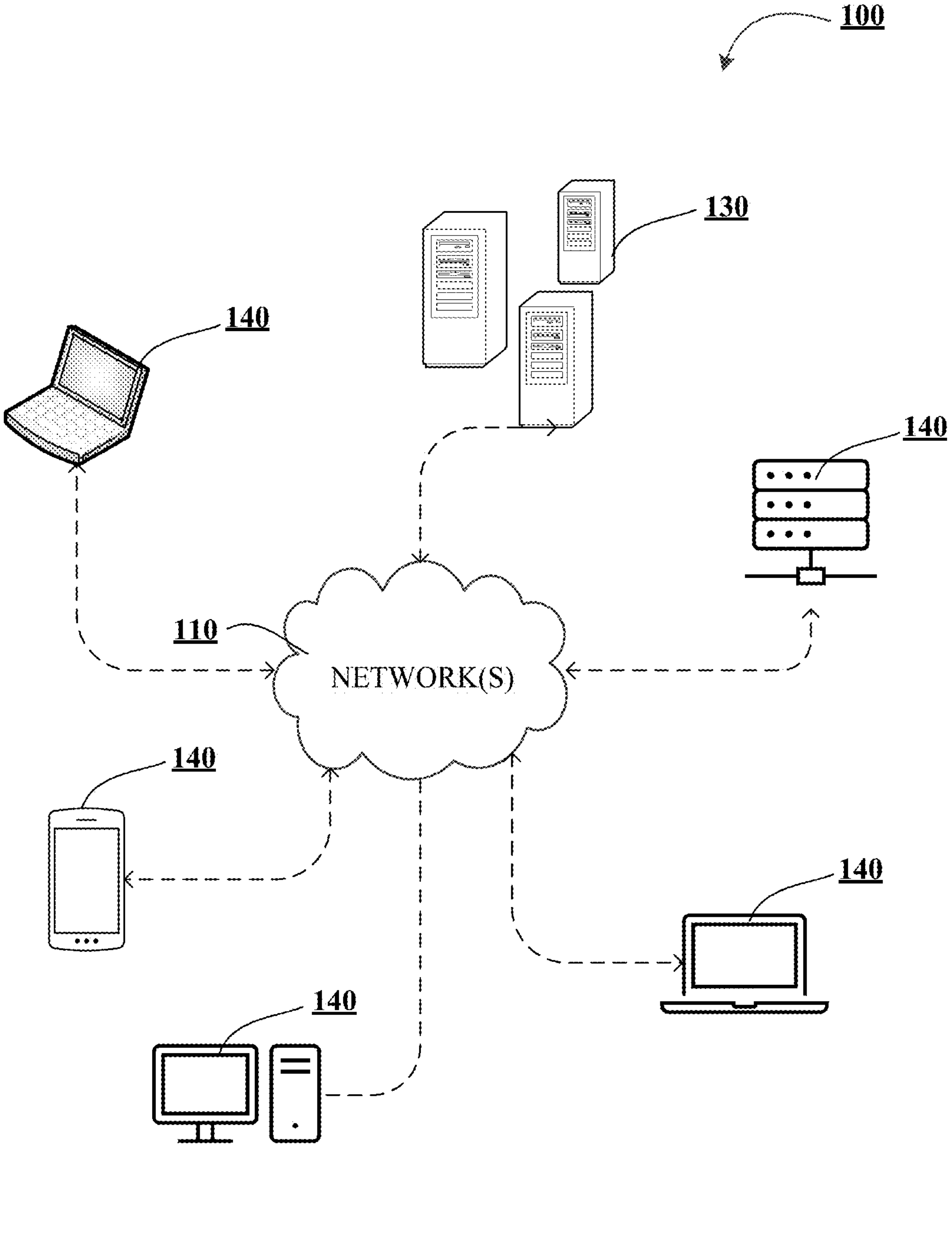
FIGS. 1A-1C illustrates technical components of an exemplary distributed computing environment for detecting and preventing malfeasant targeting of individual users in a network, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Most networks receive a large number of data communications (e.g., emails) every day. Typically, networks will have a screening tool that scans communications for potential malfeasance. Communications that are determined to be potentially malfeasant are normally blocked and users in a network do not receive said communication. However, due to memory and processing limits, the blocked communications are not analyzed and are instead deleted to protect the network. As such, malfeasant actors may repeat malfeasant communications (e.g., the same communication or slightly different to bypass the screening tools) to the same user with the goal that one or more communications get through the screening tools. Specific users that have certain access levels may be specifically targeted with multiple malfeasant communications with the goal that one of the repeated malfeasant communications will entice the target user to engage (e.g., a malfeasant actor may provide a malfeasant hyperlink in an email for the target user to engage). Only a single communication necessarily has to get through to the target user to put the network in a vulnerable position. However, screening tools that merely scan individual communications are not be able to identify potential targets of repeated malfeasant communications.

Various embodiments of the present disclosure allow for detecting and preventing malfeasant targeting of individual users in a network. The system determines the target user of a malfeasant communication data packet and then receives a malfeasance report relating to the target user. The malfeasance report includes information relating to the target user such as job title, job department, network access level, seniority of the target user, and/or the like. The malfeasance report also indicates any instances in which the target user has received any previous malfeasant communication data packet(s) (e.g., any previous communication data packets that were directed to the target user that were marked as potentially malfeasant). Based on the malfeasance report, the system determines a malfeasance threat level. The malfeasance threat level is based on the number of previous malfeasant communication data packets directed to the target user, the network access level of the target user, the job title of the target user, the job department of the target user, the seniority level of the target user, and/or the like. In an instance in which the malfeasance threat level meets or exceeds a predetermined threat threshold, the system may cause a transmission of a malfeasant threat level alert.

Figure 1B:
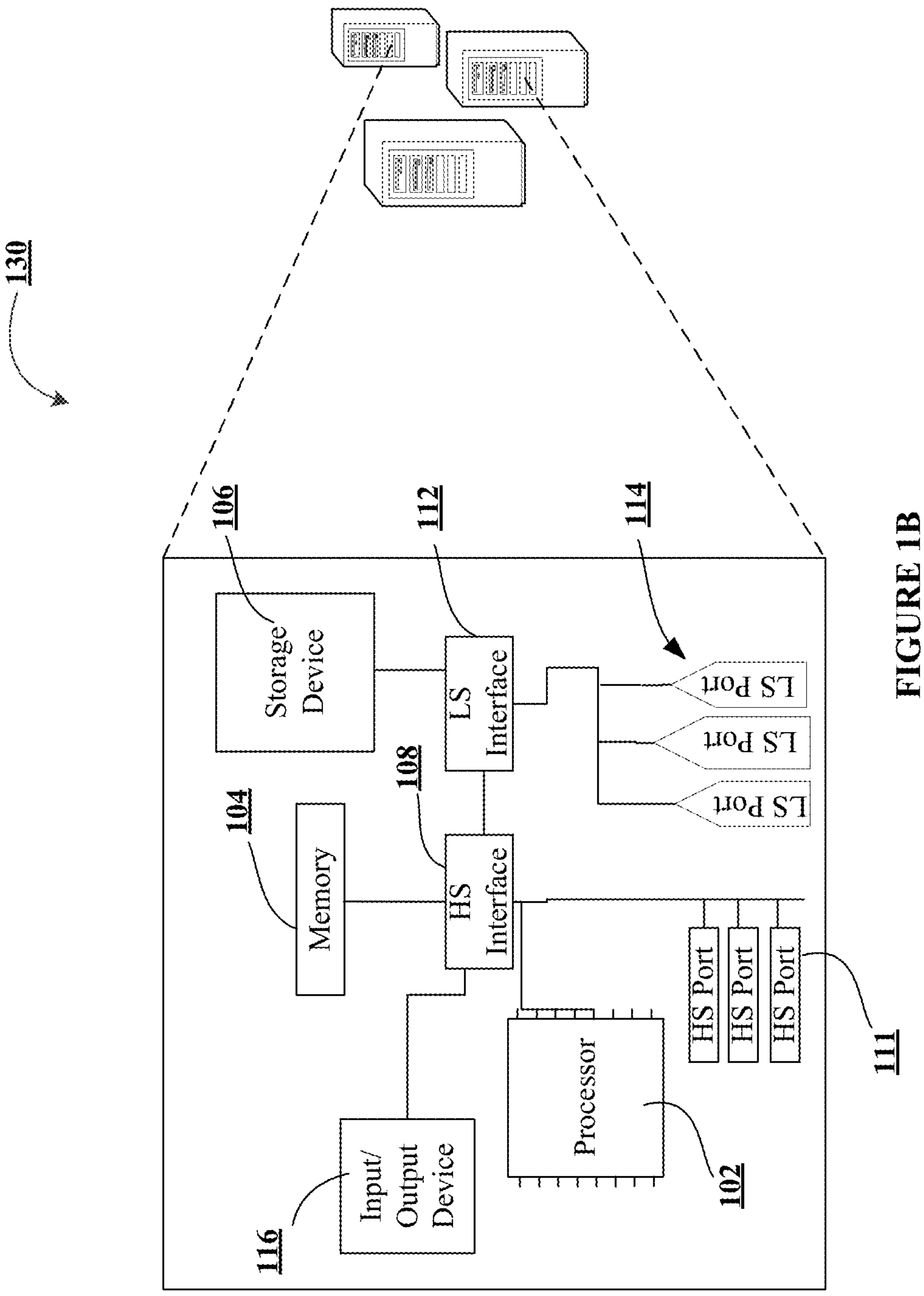
Figure 1C:
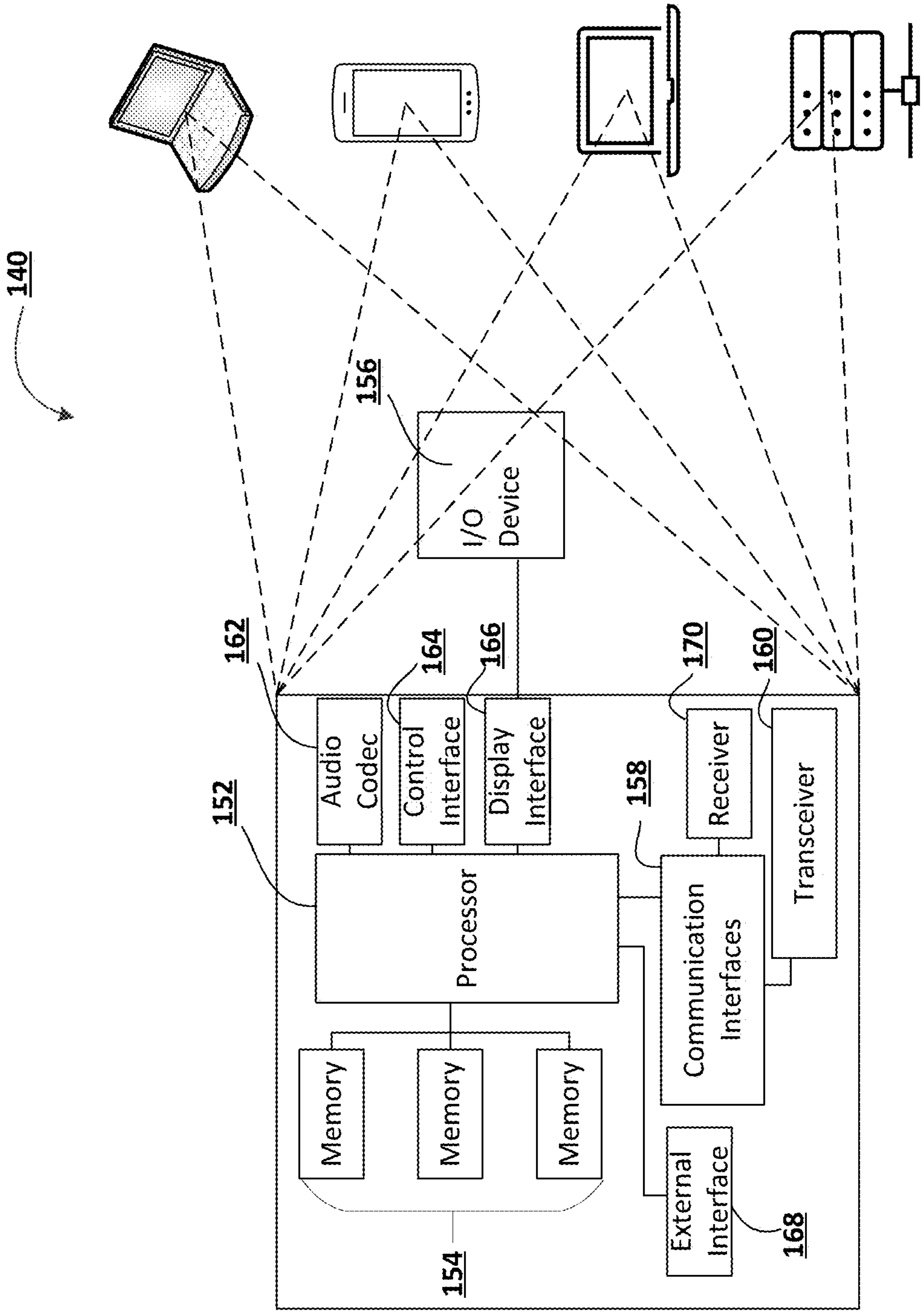

FIGS. 1A-1C illustrate technical components of an exemplary distributed computing environment for detecting and preventing malfeasant targeting of individual users in a network, in accordance with various embodiments of the disclosure. As shown in FIG. 1A, the distributed computing environment 100 contemplated herein may include a system 130 (e.g., a malfeasant activity detection device), an end-point device(s) 140, and one or more networks 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, satellite network, cellular network, and/or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through at least one of communication interfaces 158, which may include digital signal processing circuitry where necessary. Communication interfaces 158 may provide for communications under various modes or protocols, such as the Internet Protocol (IP) suite (commonly known as TCP/IP). Protocols in the IP suite define end-to-end data handling methods for everything from packetizing, addressing, and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interfaces 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130. The end-point device(s) 140 may include a communication interface that is configured to operate with a satellite network.

In various embodiments, the end-point device(s) 140 may have multiple communication interfaces that are configured to operate using the various communication methods discussed herein. For example, an end-point device 140 may have a cellular network communication interface (e.g., a communication interface that provides for communication under various telecommunications standards) and a satellite network communication interface (e.g., a communication interface that provides for communication via a satellite network). Various other communication interfaces may also be provided by the end-point device (e.g., an end-point device may be capable of communicating via a cellular network, a satellite network, and/or a wi-fi connection). Various communication interfaces may share components with other communication interfaces in the given end-point device.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
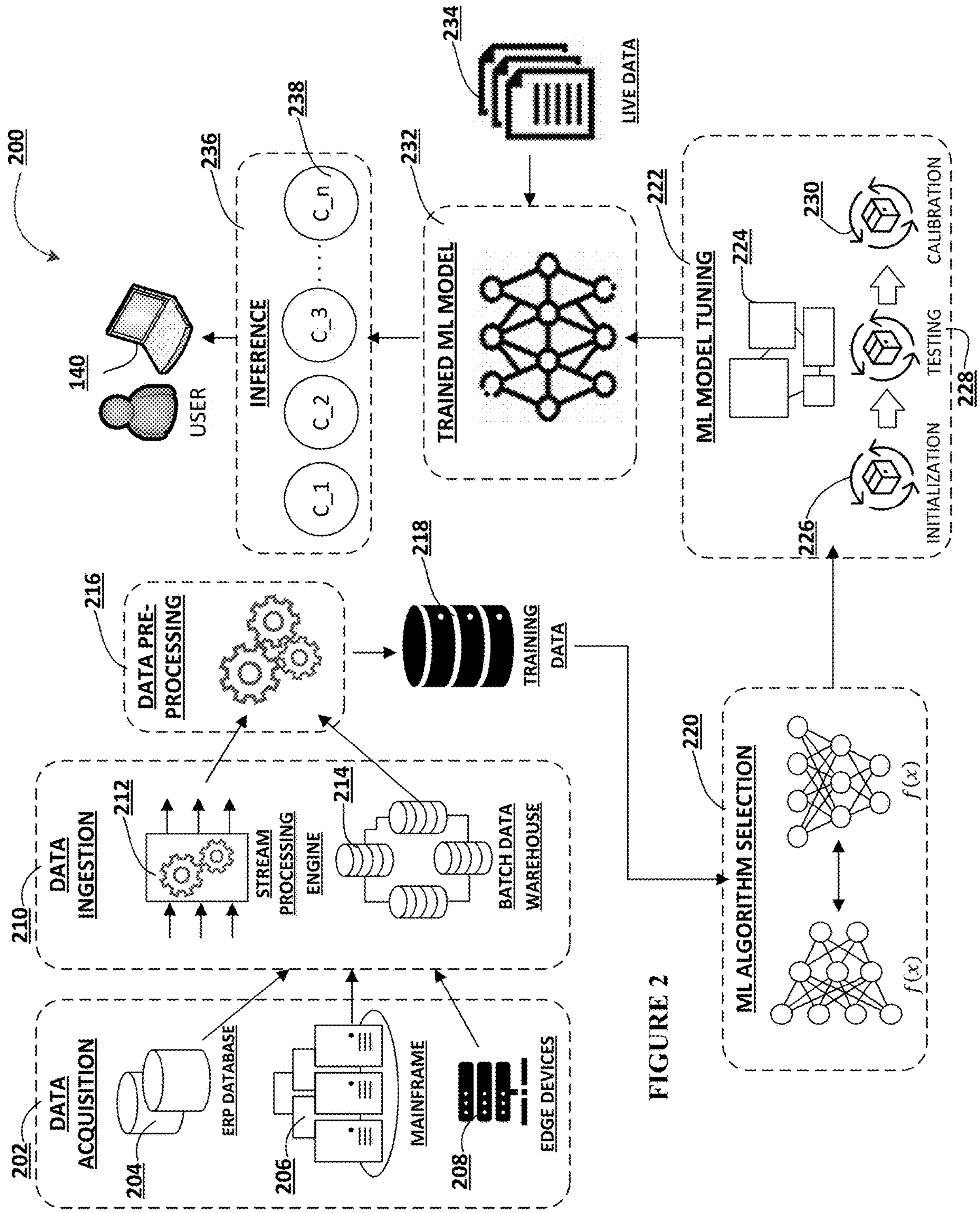
FIG. 2 illustrates an example machine learning (ML) subsystem architecture used to detect and prevent malfeasant targeting of individual users in a network, in accordance with various embodiments of the present disclosure.

FIG. 2 illustrates an example machine learning (ML) architecture 200, in accordance with an embodiment of the present disclosure. The ML subsystem architecture may be part of the components of the environment 100 (e.g., system 130). The ML subsystem architecture is used to detect and prevent malfeasant targeting of individual users in a network as discussed below in reference to FIG. 3. Namely, the ML subsystem architecture may be used to train the system to detect malfeasant communication data packets.

The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C1, C_2 . . . C_n 238) live data 234 based on how similar they are to one another to solve exploratory challenges where little is known about the data, provide a description or label (e.g., C1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

Figure 3:
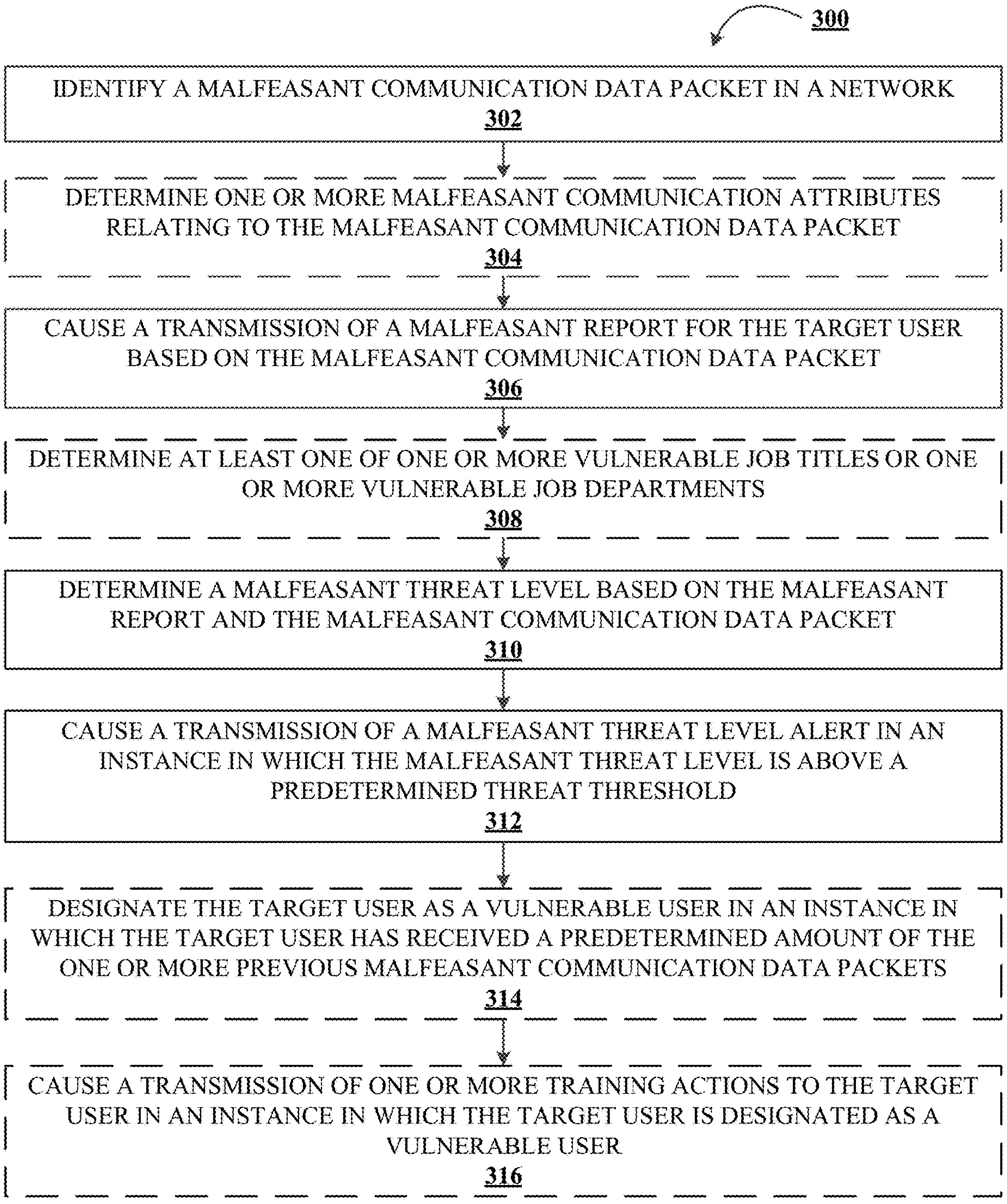
FIG. 3 illustrates a process flow for detecting and preventing malfeasant targeting of individual users in a network, in accordance with various embodiments of the present disclosure.

FIG. 3 is a flow chart 300 that illustrates an example method of detecting and preventing malfeasant targeting of individual users in a network. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. A method of various embodiments may include any combination or subset of the features discussed herein.

Referring now to Block 302 of FIG. 3, the method includes identifying a malfeasant communication data packet in a network. In various embodiments, a network may receive communication data packets, such as emails, instant messages, voice messages, etc. that are intended for users within the network (e.g., a company network may receive an email that is intended for an employee). As such, the network may have a screening process in which the communication data packets are scanned and monitored for potential malfeasance before being transmitted to the target user(s) in the network. The screening process may be carried out by the system or by a third party (e.g., a third-party software program may monitor incoming communication data packets).

Communication data packets that are found to be non-malfeasant are carried out to the intended recipient(s). Malfeasant communication data packet(s) are instead blocked from being transmitted to the intended recipient(s). A malfeasant communication data packet may be any communication across a network (e.g., email, instant message, text message, voice message, etc.) that is transmitted across the network and determined to potentially be a malfeasant communication.

The malfeasant communication data packet is directed to a target user of one or more users in the network. In various embodiments, the malfeasant communication data packet may be directed to a plurality of users in the network (e.g., an email may be directed to more than one user) and in such an instance, the system may identify one or more of the users indicated by the malfeasant communication data packet as a target user.

The malfeasant communication data packet may also be directed to one or more users outside of an entity network (e.g., an email may be directed to multiple different users relating to various entities). In such an instance, the system may monitor only specific users relating to a given entity (e.g., only users that are associated with the network of a given entity). Additionally or alternatively, the system may also monitor the amount of malfeasant communication data packets that are directed to users outside of the network (e.g., a malfeasant actor may direct a malfeasant communication data packet to the same user outside of the network across multiple malfeasant communication data packets)

Referring now to optional Block 304 of FIG. 3, the method includes determining one or more malfeasant communication attributes relating to the malfeasant communication data packet. The one or more malfeasant communication attributes may be anything relating to the contents of the malfeasant communication data packet (e.g., the subject line of an email, the body of an email, any attachments of an email, etc.), the intended recipient(s) of the malfeasant communication data packet (e.g., the target user(s)), the sender of the malfeasant communication data packet, the malfeasance type potentially detected in the malfeasant communication data packet, and/or the like.

Referring now to Block 306 of FIG. 3, the method includes causing a transmission of a malfeasant report for the target user based on the malfeasant communication data packet. In various embodiments, the entity associated with the network may have stored information relating to one or more users on the network (e.g., stored on the system 130). In various embodiments, the stored information may be stored in the system 130 (e.g., in memory 104) or remotely (e.g., outside of the system 130 in a database accessible by the system 130).

The stored information may include any information relating to the target user including, for example, information relating to one or more previous malfeasant communication data packets directed to the target user, one or more user access attributes relating to the target user, and/or any other information relating to the target user. Such information may be included in the malfeasant report. In various embodiments, the information relating to one or more previous malfeasant communication data packets directed to the target user may include the number of previously detected malfeasant communication data packets. Additionally or alternatively, the information relating to one or more previous malfeasant communication data packets directed to the target user may include specific information relating to the previous malfeasant communication data packet(s) (e.g., the type of malfeasance, the sender of previous malfeasant communication data packet(s), etc.).

In various embodiments, at least a portion of the information relating to the target user may already be possessed by the system. For example, a human resources database may already include the job title and/or job department for the target user. As such, at least a portion of the malfeasant report may be retrieved from existing databases (e.g., databases that are used for other purposes).

Upon determination of the target user, the system may retrieve the malfeasant report. The malfeasant report may include information relating to the specific target user. In some instances, the system may request specific information relating to the target user be included in the malfeasant report (e.g., the system may request the number of previous malfeasant communication data packets received, one or more user access attribute(s), and/or the like). Alternatively, the system may receive any information relating to the target user stored in the database.

In various embodiments, the malfeasant report may include information relating to the other users related to the target user. Other users may be related to the target user in an instance in which the user shares one or more user access attributes with the target user. For example, the malfeasant report may include information relating to other users in the same job department as the target user (e.g., similar users may be targeted by malfeasant actors).

In various embodiments, one or more user access attributes relating to the target user may include an access level to the network for the target user. Additionally or alternatively, the system may receive information relating to the target user in which the system can determine the access level to the network for the target user. For example, the system may receive one or more portions of the network that the target user is approved to access and/or has previously accessed and the system may determine the access level based on said received information.

In various embodiments, the one or more user access attributes relating to the target user may include a job title and/or a job department of the target user. The system may determine the access level to the network for the target user based on the job title and/or the job department. Additionally, as discussed herein, the job title and/or job department may correspond to a vulnerable job title and/or a vulnerable job department. For example, a job title that includes senior level job duties may be considered a vulnerable job title and/or a job department that typically accesses sensitive data may be considered a vulnerable job department.

Referring now to optional Block 308 of FIG. 3, the method includes determining at least one of one or more vulnerable job titles or one or more vulnerable job departments. The vulnerable job title(s) and/or vulnerable job department(s) may be determined based on the potential threat of an attack. For example, the vulnerable job title(s) and/or vulnerable job department(s) may be based on one or more previous malfeasant attacks on users assigned to the given job title or job department, access levels of one or more users assigned to the given job title or job department (e.g., some job titles and/or job departments may have higher access levels), and/or the like.

A vulnerable job title and/or vulnerable job department may be based on a scope of damage from a potential malfeasant attack. For example, a senior officer in an entity may have higher access levels and a successful attack would have a wider scope of damage than a junior user with lower access levels. Additionally, certain job titles and/or job departments may be more susceptible to malfeasant attack attempts. For example, some job departments may not have employees that are technologically knowledgeable and may be more susceptible to a malfeasant attack that is not blocked by the system.

Referring now to Block 310 of FIG. 3, the method includes determining a malfeasant threat level based on the malfeasant report and the malfeasant communication data packet. The malfeasant threat level indicates a threat of a malfeasant communication to the target user. In various embodiments, the malfeasant threat may also indicate scope of damage from an attack stemming from a malfeasant communication. For example, a successful malfeasant attack from a malfeasant communication directed to a target user with a higher access level of the network would likely have a higher scope of damage than a successful malfeasant attack from a malfeasant communication directed to a target user with a lower access level of the network (e.g., the malfeasant actor may access more of the network if an attack against a higher access level user is successful).

The malfeasant threat level may be affected by one or more of the previous malfeasant communication data packet (s), one or more of the user access attributes(s), one or more malfeasant communication attribute(s) (e.g., contents of the malfeasant data packet, such as sender, attachment type, attachment content, and/or the like), and/or the like. For example, the higher the number of previous malfeasant communication data packets, the higher the malfeasant threat level may be for the given target user. Additionally or alternatively, the target user may be in a vulnerable job title, a vulnerable job department, and/or have a requisite network access level, such that the malfeasant threat level is affected (e.g., the malfeasant threat level may be elevated in an instance in which the target user is in a vulnerable job title and/or vulnerable job department). In various embodiments, the malfeasant threat level may be affected by one or more malfeasant communication attribute(s), such as the type of attachment (e.g., some types of attachments, such as executable files may be more dangerous than other types of attachments).

In various embodiments, the malfeasant threat level may be affected by one or more previous malfeasant communication data packet(s). For example, the malfeasant threat level may be higher in an instance in which at least one of the one or more previous malfeasant communication data packets are the same malfeasance type as the malfeasance communication data packet. In various embodiments, the malfeasant threat level may be affected by the similarities of one or more of the previous malfeasant communication data packet(s) to the malfeasant communication data packet. For example, the malfeasant communication data packet sharing similarities with one or more of the previous malfeasant communication data packet(s) may indicate that the target user is the target of a specific attack and the malfeasant threat level may be higher.

The malfeasant threat level may be affected by one or more of the user access attribute(s) of the target user. Example user access attributes that may affect the malfeasant threat level include job title (e.g., senior level management may have a higher malfeasant threat level than other job titles), job department, network access levels, and/or the like. For example, the malfeasant threat level may be higher in an instance in which the target user is assigned to a job title that is designated as one of one or more vulnerable job titles or the target user is assigned to a job department that is designated as one of one or more vulnerable job departments.

In various embodiments, the malfeasant threat level may be binary. In such an example, the malfeasant threat level may be one (e.g., indicating a threat) in an instance in which one or more requisites are met. The one or more requisites may relate to the previous malfeasant communication data packet(s) (e.g., a predetermined number of previous malfeasant communication data packets directed to the target user), one or more of the user access attribute(s) (e.g., a target user having a certain access level to the network, a job title that matches a vulnerable job title, a job department that matches a vulnerable job department, and/or the like), and/or the like. Alternatively, the malfeasant threat level may be more than binary, but instead may be numerical (e.g., between 0 and 100 with a predetermined threat threshold being a number between 0 and 100).

Referring now to Block 312 of FIG. 3, the method includes causing a transmission of a malfeasant threat level alert in an instance in which the malfeasant threat level meets or exceeds a predetermined threat threshold. The predetermined threat threshold may be based on the amount of security desired for the network (e.g., a lower predetermined threat threshold may lead to a more secure network).

In various embodiments, certain aspects of the malfeasant threat level may cause the malfeasant threat level to meet or exceed the predetermined threat threshold. For example, the malfeasant threat level and/or the predetermined threat threshold may be binary (e.g., the malfeasant threat level may either be zero or one with the predetermined threat threshold is one). In such an example, the malfeasant threat level may meet or exceed the predetermined threat threshold in an instance one or more requisites is met. The one or more requisites may be based on the number of previous malfeasant communication data packets (e.g., the malfeasant threat level may meet or exceed a predetermined threat threshold in an instance in which a predetermined number of the one or more previous malfeasant communication data packets has been reached), one or more user access attributes being met (e.g., a target user having a vulnerable job title and/or a vulnerable job department, a target user having a specific access level or higher, etc.), and/or the like.

Additionally or alternatively, the malfeasant threat level may be meet or exceed a predetermined threat threshold in an instance in which one or more user access attributes are met. For example, the malfeasant threat level may meet or exceed a predetermined threat threshold in an instance in which the access level of the target user is at or above a predetermined access threshold. In various embodiments, the malfeasant threat level may meet or exceed a predetermined threat threshold in an instance in which the job title and/or the job In various embodiments, a combination of the amount of previous malfeasant communication data packets, the one or more user access attributes, and/or the like may be used to determine the malfeasant threat level.

Additionally, the malfeasant threat level need not be a binary number for one or more aspects to cause the malfeasant threat level to meet or exceed the predetermined threat threshold. For example, certain aspects, such as the requisites discussed above, may cause the malfeasant threat level to increase to at least the predetermined threat threshold.

In various embodiments, the malfeasant threat level alert may be a message with information relating to the target user and/or the malfeasant communication data packet. The malfeasant threat level alert may be a message to one or more user in the network that are capable of monitoring the network. For example, the malfeasant threat level alert may be a message to a network specialist that investigates potential attacks. The malfeasant threat level alert may include the target user, the number of previous malfeasant communication data packets (e.g., total number of the malfeasant communication data packet and the previous malfeasant communication data packet(s) combined), type of malfeasant attacks, and/or the like. As such, the malfeasant threat level alert may be used to investigate attempted malfeasant attacks. Additionally, the malfeasant threat level alert may be used to detect other malfeasant attacks. For example, in an instance in which multiple users in a given job department are the target of a malfeasant communication data packets, the system or a network specialist may determine whether any other users in the job department were also targeted and/or the object of a malfeasant attack.

In various embodiments, the malfeasant threat level alert may also cause execution of one or more remedy actions configured to prevent future malfeasant communication data packets. The one or more remedy actions may include the one or more training actions (e.g., discussed below in reference to optional Block 316). Various other remedy actions may be contemplated, such as reducing network access levels for one or more users for a period of time, limiting certain type of communication data packets, and/or the like.

Referring now to optional Block 314 of FIG. 3, the method includes designating the target user as a vulnerable user in an instance in which the target user has received a predetermined amount of the one or more previous malfeasant communication data packets. In an instance in which the target user is designated as a vulnerable user, the user may malfeasant threat level may meet or exceed the threat level threshold.

In various embodiments, the target user may be designated as a vulnerable user in an instance in which one or more user attributes are met. For example, the target user may be a vulnerable user in an instance in which the target user has a job title and/or job department that is a vulnerable job title or a vulnerable job department. Additionally or alternatively, the target user may be designated as a vulnerable user in an instance in which the target user has a certain network access level or higher.

Referring now to optional Block 316 of FIG. 3, the method includes causing a transmission of one or more training actions to the target user in an instance in which the target user is designated as a vulnerable user. The one or more training actions may include a fabricated malfeasant communication data packet. In various embodiments, the fabricated malfeasant communication data packet may be designed to emulate a malfeasant communication data packet. For example, the fabricated malfeasant communication data packet may be an email to the target user that includes suspicious link. In an instance in which the target user engages the suspicious link, the target user may be required to have additional training (e.g., engaging the link indicates the target user is susceptible to a malfeasant attack).

In various embodiments, the one or more training actions may include at least one of information relating to the malfeasant communication data packet and/or one or more previous malfeasant data packet. In various embodiments, a communication may be sent to one or more users about attempted malfeasant attacks. For example, a target user may receive an email that indicates that the target user has been a target of a malfeasant communication data packet and include information relating to the malfeasant communication data packet. In such an instance, the information provided to the target user may be to assist the target user to identify future malfeasant communication data packets.

Referring now to optional Block 318 of FIG. 3, the method includes updating a machine learning model configured to identify malfeasant communications. In various embodiments, the method may use any of the components of the ML architecture 200 shown and discussed above in reference to FIG. 2 to train and/or update a machine learning model. In various embodiments, a machine learning model may be trained to detect malfeasant activity relating to one or more electronic communications. As such, the machine learning model may be used to identify a malfeasant communication data packet. Additionally, the machine learning model may be trained via information gather in the operations herein. In various embodiments, information relating to malfeasant communication data packets may be stored to train the machine learning model. For example, different types of malfeasant communication data packets may include different attributes that can be used to train the machine learning model.

In various embodiments, the data relating to the operations herein may be provided to a third party assigned with determining malfeasant activity. As such, the data may be used by the third party to update any learning models. For example, the system may have a third-party screening software that provides an indication to the system that a communication data packet may be malfeasant (e.g., the system may identify a malfeasant communication data packet based on the indication from the third-party screening software that the given communication data packet may be malfeasant).

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a “system.” Furthermore, embodiments of the present disclosure may take the form of a computer program product that includes a computer-readable storage medium having computer-executable program code portions stored therein. As used herein, a processor may be “configured to” perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the “C” programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for detecting and preventing malfeasant targeting of individual users in a network, the system comprising:
- at least one non-transitory storage device containing instructions; and
- at least one processing device coupled to the at least one non-transitory storage device, wherein the at least one processing device, upon execution of the instructions, is configured to:
- identify a malfeasant communication data packet in a network, wherein the malfeasant communication data packet is directed to a target user of one or more users in the network;
- analyze one or more previously accessed portions of the network by the target user to determine an access level of the target user, wherein the access level comprises portions of the network the target user is approved to access and has previously accessed, wherein the portions of the network comprise network resources that a malfeasant actor may access if an attack against the target user is successful;
- cause a transmission of a malfeasant report for the target user based on the malfeasant communication data packet, wherein the malfeasant report is retrieved from one or more databases storing information relating to the target user and comprises information relating to one or more previous malfeasant communication data packets directed to the target user including a number of previously detected malfeasant communication data packets and one or more user access attributes relating to the target user, wherein the one or more user access attributes comprise the access level to the network for the target user;
- based on the malfeasant report and the malfeasant communication data packet, determine a malfeasant threat level, wherein the malfeasant threat level indicates a threat of a malfeasant communication to the target user and a scope of damage associated with the malfeasant communication data packet based on the access level of the target user, wherein the scope of damage is higher for a target user with a higher access level of the network based on a malfeasant actor being able to access more of the network if an attack against the target user is successful;
- cause a transmission of a malfeasant threat level alert in an instance in which the malfeasant threat level meets or exceeds a predetermined threat threshold, wherein the malfeasant threat level meets or exceeds a predetermined threat threshold in an instance in which a predetermined number of the one or more previous malfeasant communication data packets has been reached or the access level of the target user is at or above a predetermined access threshold;
- designate the target user as a vulnerable user in an instance in which the target user has received a predetermined amount of the one or more previous malfeasant communication data packets; and
- cause a transmission of one or more training actions to the target user in an instance in which the target user is designated as a vulnerable user, wherein the one or more training actions comprise a fabricated malfeasant communication data packet, wherein the fabricated malfeasant communication data packet is designed to emulate a malfeasant communication data packet.

2. The system of claim 1, wherein the at least one processing device, upon execution of the instructions, is configured to determine one or more malfeasant communication attributes relating to the malfeasant communication data packet, wherein the one or more malfeasant communication attributes comprises the target user of the one or more users in the network and a malfeasance type.

3. The system of claim 2, wherein the malfeasant threat level is higher in an instance in which at least one of the one or more previous malfeasant communication data packets are the same malfeasance type as the malfeasance communication data packet.

4. The system of claim 1, wherein the one or more user access attributes comprise at least one of a job title or job department of the target user, wherein the malfeasant threat level is higher in an instance in which the target user is assigned to a job title that is designated as one of one or more vulnerable job titles or the target user is assigned to a job department that is designated as one of one or more vulnerable job departments.

5. The system of claim 4, wherein the at least one processing device, upon execution of the instructions, is configured to determine at least one of the one or more vulnerable job titles or one or more vulnerable job departments, wherein the at least one of the one or more vulnerable job titles or one or more vulnerable job departments are determined based on one or more previous malfeasant attacks on users assigned to the given job title or job department.

6. The system of claim 5, wherein the at least one of the one or more vulnerable job titles or one or more vulnerable job departments are determined based on access levels of one or more users assigned to the given job title or job department.

7. A computer program product for detecting and preventing malfeasant targeting of individual users in a network, the computer program product comprising at least one non-transitory computer-readable medium having computer-readable program code portions embodied therein, the computer-readable program code portions comprising one or more executable portions configured to:

identify a malfeasant communication data packet in a network, wherein the malfeasant communication data packet is directed to a target user of one or more users in the network;

analyze one or more previously accessed portions of the network by the target user to determine an access level of the target user, wherein the access level comprises portions of the network the target user is approved to access and has previously accessed, wherein the portions of the network comprise network resources that a malfeasant actor may access if an attack against the target user is successful;

cause a transmission of a malfeasant report for the target user based on the malfeasant communication data packet, wherein the malfeasant report is retrieved from one or more databases storing information relating to the target user and comprises information relating to or more previous malfeasant communication data packets directed to the target user including a number of previously detected malfeasant communication data packets and one or more user access attributes relating to the target user, wherein the one or more user access attributes comprise the access level to the network for the target user;

based on the malfeasant report and the malfeasant communication data packet, determine a malfeasant threat level, wherein the malfeasant threat level indicates a threat of a malfeasant communication to the target user and a scope of damage associated with the malfeasant communication data packet based on the access level of the target user, wherein the scope of damage is higher for a target user with a higher access level of the network based on a malfeasant actor being able to access more of the network if an attack against the target user is successful;

cause a transmission of a malfeasant threat level alert in an instance in which the malfeasant threat level meets or exceeds a predetermined threat threshold, wherein the malfeasant threat level meets or exceeds a predetermined threat threshold in an instance in which a predetermined number of the one or more previous malfeasant communication data packets has been reached or the access level of the target user is at or above a predetermined access threshold;

designate the target user as a vulnerable user in an instance in which the target user has received a predetermined amount of the one or more previous malfeasant communication data packets; and cause a transmission of one or more training actions to the target user in an instance in which the target user is designated as a vulnerable user, wherein the one or more training actions comprise a fabricated malfeasant communication data packet, wherein the fabricated malfeasant communication data packet is designed to emulate a malfeasant communication data packet.

8. The computer program product of claim 7, wherein the computer-readable program code portions comprising one or more executable portions are also configured to determine one or more malfeasant communication attributes relating to the malfeasant communication data packet, wherein the one or more malfeasant communication attributes comprises the target user of the one or more users in the network and a malfeasance type.

9. The computer program product of claim 8, wherein the malfeasant threat level is higher in an instance in which at least one of the one or more previous malfeasant communication data packets are the same malfeasance type as the malfeasance communication data packet.

10. The computer program product of claim 7, wherein the one or more user access attributes comprise at least one of a job title or job department of the target user, wherein the malfeasant threat level is higher in an instance in which the target user is assigned to a job title that is designated as one of one or more vulnerable job titles or the target user is assigned to a job department that is designated as one of one or more vulnerable job departments.

11. The computer program product of claim 10, wherein the computer-readable program code portions comprising one or more executable portions are also configured to determine at least one of the one or more vulnerable job titles or one or more vulnerable job departments, wherein the at least one of the one or more vulnerable job titles or one or more vulnerable job departments are determined based on one or more previous malfeasant attacks on users assigned to the given job title or job department.

12. The computer program product of claim 11, wherein the at least one of the one or more vulnerable job titles or one or more vulnerable job departments are determined based on access levels of one or more users assigned to the given job title or job department.

13. A method for detecting and preventing malfeasant targeting of individual users in a network, the method comprising:

identifying a malfeasant communication data packet in a network, wherein the malfeasant communication data packet is directed to a target user of one or more users in the network;

analyzing one or more previously accessed portions of the network by the target user to determine an access level of the target user, wherein the access level comprises portions of the network the target user is approved to access and has previously accessed, wherein the portions of the network comprise network resources that a malfeasant actor may access if an attack against the target user is successful;

causing a transmission of a malfeasant report for the target user based on the malfeasant communication data packet, wherein the malfeasant report is retrieved from one or more databases storing information relating to the target user and comprises information relating to one or more previous malfeasant communication data packets directed to the target user including a number of previously detected malfeasant communication data packets and one or more user access attributes relating to the target user, wherein the one or more user access attributes comprise the access level to the network for the target user;

based on the malfeasant report and the malfeasant communication data packet, determining a malfeasant threat level, wherein the malfeasant threat level indicates a threat of a malfeasant communication to the target user and a scope of damage associated with the malfeasant communication data packet based on the access level of the target user, wherein the scope of damage is higher for a target user with a higher access level of the network based on a malfeasant actor being able to access more of the network if an attack against the target user is successful;

causing a transmission of a malfeasant threat level alert in an instance in which the malfeasant threat level meets or exceeds a predetermined threat threshold, wherein the malfeasant threat level meets or exceeds a predetermined threat threshold in an instance in which a predetermined number of the one or more previous malfeasant communication data packets has been reached or the access level of the target user is at or above a predetermined access threshold;

designating the target user as a vulnerable user in an instance in which the target user has received a predetermined amount of the one or more previous malfeasant communication data packets; and causing a transmission of one or more training actions to the target user in an instance in which the target user is designated as a vulnerable user, wherein the one or more training actions comprise a fabricated malfeasant communication data packet, wherein the fabricated malfeasant communication data packet is designed to emulate a malfeasant communication data packet.

14. The method of claim 13, further comprising determining one or more malfeasant communication attributes relating to the malfeasant communication data packet, wherein the one or more malfeasant communication attributes comprises the target user of the one or more users in the network and a malfeasance type.

15. The method of claim 14, wherein the malfeasant threat level is higher in an instance in which at least one of the one or more previous malfeasant communication data packets are the same malfeasance type as the malfeasance communication data packet.

16. The method of claim 13, wherein the one or more user access attributes comprise at least one of a job title or job department of the target user, wherein the malfeasant threat level is higher in an instance in which the target user is assigned to a job title that is designated as one of one or more vulnerable job titles or the target user is assigned to a job department that is designated as one of one or more vulnerable job departments.

17. The method of claim 16, further comprising determining at least one of the one or more vulnerable job titles or one or more vulnerable job departments, wherein the at least one of the one or more vulnerable job titles or one or more vulnerable job departments are determined based on one or more previous malfeasant attacks on users assigned to the given job title or job department, and wherein the at least one of the one or more vulnerable job titles or one or more vulnerable job departments are determined based on access levels of one or more users assigned to the given job title or job department.

* * * * *